(12) United States Patent
Faure et al.

(10) Patent No.: US 8,793,340 B2
(45) Date of Patent: Jul. 29, 2014

(54) CONTROLLED SHARING OF PERSONAL DATA

(75) Inventors: Frédéric Faure, Cassis (FR); Lionel Mallet, Marseilles (FR)

(73) Assignee: Gemalto SA, Gemenos (FR)

(*) Notice: Subject to any disclaimer, the term of this patent is extended or adjusted under 35 U.S.C. 154(b) by 765 days.

(21) Appl. No.: 12/307,405

(22) PCT Filed: Jul. 10, 2007

(86) PCT No.: PCT/EP2007/057016
§ 371 (c)(1),
(2), (4) Date: Apr. 21, 2009

(87) PCT Pub. No.: WO2008/006821
PCT Pub. Date: Jul. 17, 2008

(65) Prior Publication Data
US 2009/0327420 A1 Dec. 31, 2009

(30) Foreign Application Priority Data
Jul. 10, 2006 (FR) ...................................... 06 52897

(51) Int. Cl.
*G06F 15/16* (2006.01)
*G06F 21/62* (2013.01)
*H04L 29/06* (2006.01)

(52) U.S. Cl.
CPC ............ *H04L 63/12* (2013.01); *G06F 21/6245* (2013.01)
USPC ............................ 709/219; 709/204; 709/218

(58) Field of Classification Search
USPC .................................................. 709/204, 219
See application file for complete search history.

(56) References Cited

U.S. PATENT DOCUMENTS

| 2002/0040397 | A1* | 4/2002 | Choi ............................ 709/226 |
| 2004/0117430 | A1* | 6/2004 | Bazot et al. ................... 709/200 |
| 2004/0193685 | A1 | 9/2004 | Proehl |
| 2004/0267625 | A1* | 12/2004 | Feng et al. ...................... 705/26 |
| 2005/0010780 | A1 | 1/2005 | Kane et al. |
| 2007/0067297 | A1* | 3/2007 | Kublickis .......................... 707/9 |

OTHER PUBLICATIONS

Napster—A New Killer Internet App—Evolt, Author: Matt Haughey, Published: Nov. 11, 1999 http://evolt.org/node/564.*
Form PCT/ISA/210 (International Search Report) dated Nov. 14, 2007.

* cited by examiner

*Primary Examiner* — Noel Beharry
(74) *Attorney, Agent, or Firm* — Buchanan Ingersoll & Rooney

(57) ABSTRACT

A first user of a first communicating object shares personal data in response to a request from a second user. The shared data are associated with a reference of the second user in the first communicating object and are transmitted to the second communicating object in order to be recorded therein in association with a reference of the first user. The first user controls the shared personal data from the first communicating object by transmitting a control instruction to the second communicating object. The instruction contains at least the reference of the first user in order to find the personal data of the first user in association with the reference in the second communicating object, and to treat the personal data according to the transmitted control instruction.

20 Claims, 7 Drawing Sheets

CONTROLLED SHARING OF PERSONAL DATA

The present invention relates to the controlled sharing of personal data.

More particularly, it relates to the sharing of personal data which is controlled and managed by the owner of the personal data.

At present, when a person A wishes to share with a person B personal data relating to himself/herself, such as phone numbers, mail addresses, electronic addresses, via terminals, the person A looses control on the way the person B will use the data which he or she transmitted thereto, and on the time during which the same data will be used. However it seems obvious that the person A should be the only one to decide on the rules of utilization of the personal data she shared with other persons or even to deny the sharing at any time. However it should be advisable that person A who authorizes the sharing of data can guarantee that such data will remain updated for all the persons whom she shared thereof with.

The operations of updating personal data in the existing telecommunication systems are based on centralized solutions wherein a server records personal data of the person A in association with identifiers of other persons liable to use such data, such as the person B. The server regularly requests the terminal of the person A, the owner of the recorded personal data, to check the validity thereof in order to carry out the updating on the server, if need be, and for ordering such updating in the terminals of the other persons whose identifiers are recorded in association with the data of the person A in the server.

Such updating of personal data cannot be automatically carried out on decentralized networks of the ad-hoc type through the direct communication between the terminals of persons A and B and is only carried out in an informal way.

On the other hand, no current solution makes it possible to delete from person A's terminal his or her personal data which were shared with other persons, in the other persons' terminals.

The aim of the invention is the control of the sharing of personal data directly managed in a communicating object of the user owning such personal data.

To reach this aim, a method for controlling the sharing of a first user of a first communicating object with a second user of a second communication object is characterized in that it includes the following steps:

sharing in the first communicating object, in response to a request from the second user, personal data of the first user recorded in the first communicating object among other personal data of the first user, associating in the first communicating object the shared personal data with the reference of the second user, and transmitting the shared personal data to the second communicating object and recording thereof in a second communicating object in association with a reference of the first user.

According to a characteristic of the invention, the method includes, after the step of sharing, a step for controlling from the first communicating object the shared personal data of the first user by transmitting a control instruction containing at least the reference of the first user to the second communicating object, in order to find in the second communicating object the personal data of the first user in association with the reference extracted from the control instruction and treat said personal data according to the transmitted control instruction.

Advantageously, the invention remote controls from the first communicating object such as a mobile terminal associated to a chip card or to any other type of terminal, the shared personal data of the first user recorded in a communicating object of the second user. The first user keeps the control of his or her own data in the other users' communicating objects.

According to a characteristic of the invention, the control of the personal data may include:

in the first communicating object, an updating of at least one personal datum of the first user into a modified personal datum, the search for the reference of the second user associated with the personal datum and the transmission of the control instruction containing the modified personal datum and the reference of the first user to the second communicating object, and the updating of the personal datum associated with the reference of the first user extracted from the control instruction in the second communicating object according to the modified personal datum extracted from the control instruction.

The control of personal data may also includes the transmission of the control instruction containing the reference of the first user from the first communicating object to the second communicating object, the deletion of at least one personal datum associated with the reference of the first user extracted from the control instruction in the second communicating object, and the deletion of an association between said personal datum and the reference of the second user in the first communicating object.

According to another characteristic of the invention, the method initially includes the recording of the personal data of the first user and the first communicating object, the transmission from an access address of the first communicating object from said first communicating object to server means, the generation of the reference of the first user by the server means and the matching of the reference with the transmitted access address in the server means.

According to another aspect of the invention, the rules of utilization drawn up by the first user are transmitted together with the shared personal data from the first communicating object with a second communicating object.

The invention also relates to a communicating object of the first user communicating with a second communicating object of a second user for controlling the sharing of personal data of the first user with the second user. Said communicating object is characterized in that it includes:

means for sharing, in response to a request from the second user, personal data of the first user recorded in the first communicating object among other personal data of the user, means for associating the shared personal data with a reference (RUB) of the second user, means for transmitting the shared personal data to the second communicating object, in order to record the transmitted personal data in the second communicating object in association with a reference (RUA) of the first user, and means for controlling the shared personal data of the first user by transmitting a control instruction containing at least the reference of the first user to the second communicating object, in order to find in the second communicating object the personal data of the first user in association with the reference extracted from the control instruction and to treat said personal data according to the transmitted control instruction.

The invention relates to a computer program able to be implemented in said communicating object communicating with a second user for controlling the sharing of personal data of the first user with the second user. The program includes instructions which, when the program is run in said first communicating object, carry out the following steps:

Sharing, in response to a request from the second user, personal data of the first user recorded in the first communicating object among other personal data of the first user, associating the shared personal data with a reference of the second user, transmitting the shared personal data to the second communicating object in order to record the transmitted personal data in the second communicating object in association with a reference of the first user, and controlling said shared personal data of the first user by transmitting a control instruction containing at least the reference of the first user to the second communicating object, in order to find in the second communicating object the personal data of the first user, in association with the reference extracted from the control instruction and to treat said personal data according to the transmitted control instruction.

The invention also relates to a communicating object communicating with a first communicating object of a first user controlling the sharing of personal data with a second user utilizing said communicating object. Said communicating object is characterized in that it includes:

means for requesting personal data from the first user recorded in the first communicating object among other personal data of the first user, the shared personal data recorded in the first communicating object being associated with the reference of the second user, means for recording the transmitted shared personal data in association with a reference of the first user, and means for treating the shared personal data associated to the reference of the first user extracted from a control instruction transmitted from the first communicating object according to the control instruction.

Eventually, the invention relates to a computer program able to be implemented in said communicating object communicating with a first communicating object of a first user controlling the sharing of personal data with a second user using said communicating object. The program includes instruction which, when the program is run in said communicating object, carry out the following steps:

requesting personal data from the first user recorded in the first communicating object among other personal data of the first user, the shared personal data recorded in said first communicating object being associated with a reference of the second user, recording the transmitted shared personal data in association with a reference of the first user, and treating the shared personal data associated with the reference of the first user extracted from a control instruction transmitted from the first communicating object, according to the transmitted control instruction.

A communicating object may include sharing means, associating means, transmitting means and controlling means such as included in the first communicating object mentioned hereabove and requesting means, recording means and processing means such as included in the second communicating object mentioned hereabove.

Other characteristics and advantages of the present invention will appear more clearly upon reading the following description of several embodiments of the invention given as non limitative examples and referring to the corresponding appended drawings wherein.

Figure 1:
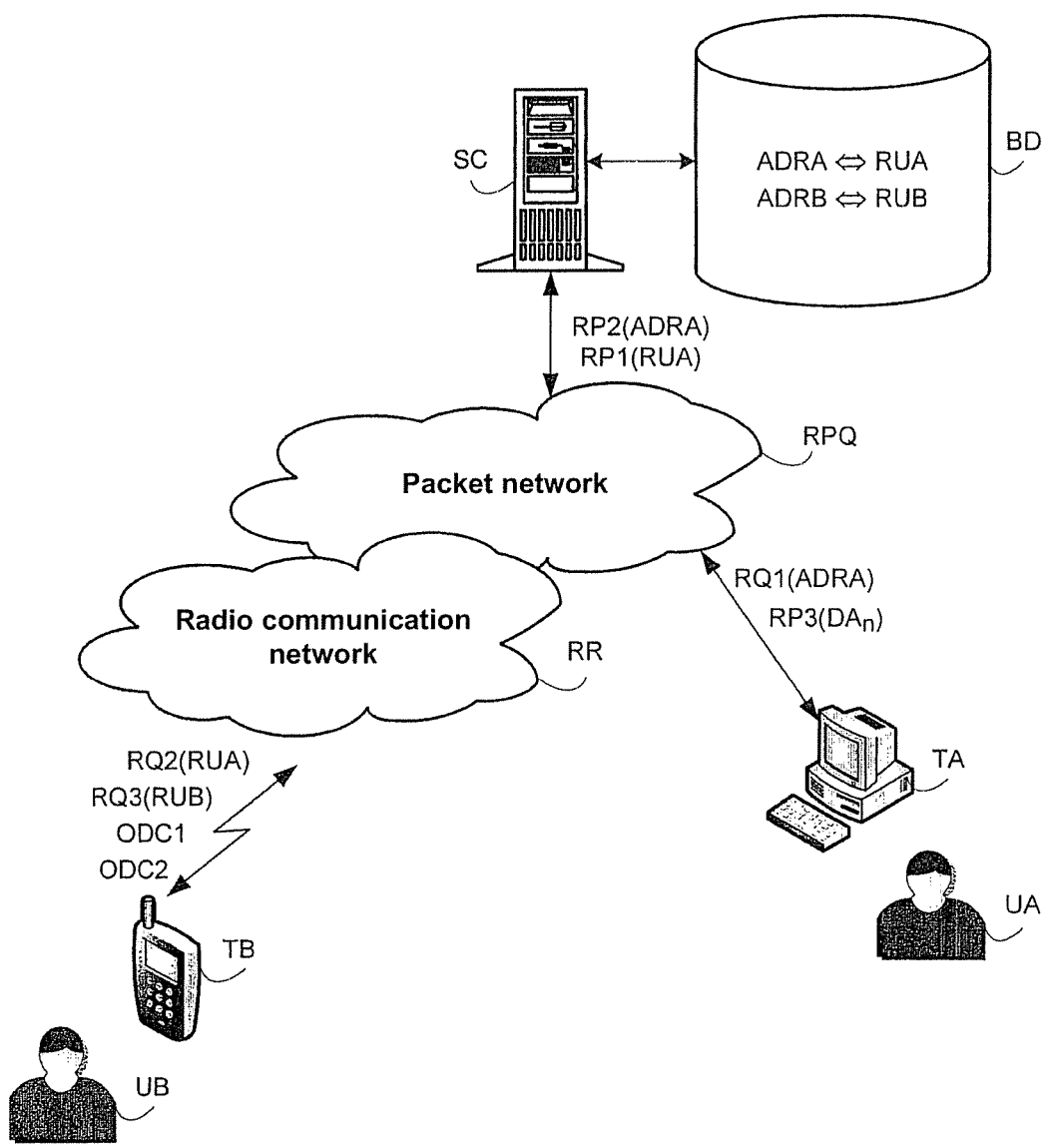
FIG. 1 is a schematic block diagram of a system for sharing personal data implementing a method for controlling the sharing of personal data according to the invention.

In a system for sharing personal data as illustrated in FIG. 1, users each own a communicating object such as a personal computer TA, a mobile radio terminal TB or any other communication personal device communicating with a corresponding server SC through a telecommunication network RR-RPQ.

The telecommunication network includes a cellular radio communication network RR of the GSM type with the management of mobility and access through a GPRS radio channel or of the CDMA (Coded Division Multiple Access) type, of the third generation (3GPP) of the UMTS (Universal Mobile Telecommunications System) or UTRAN (UMTS Terrestrial Radio Access Network) types or of the third generation (3GPP2) of the CDMA 2000 type backed by a switching data network RPQ of the internet type. The network RT can also be a local network of the WiFi (Wireless Fidelity), WiMax (Worldwide Interoperability for Microwave Access) or Wibro (Wireless Broadband) types or still a wireless network of the infrared, Bluetooth or NFC (Near Field Communication) types.

The correspondence server SC is connected to a data base BD which contains access addresses ADRA, ADRB of directory agents of communicating objects TA, TB of the telecommunications network respectively corresponding to the references RUA, RUB of the users UA, UB of such communicating objects. A directory agent in a communicating object manages the personal data of the user of said object and the personal data of users of other communicating objects. An access address ADRA, ADRB of a directory agent of the communicating object is a phone number or a network address of the IP (Internet Protocol) type. A reference RUA, RUB of a user of a communicating object is preferably anonymous and characterizes the user and/or his or her communicating object, without another user being able to identify him or her directly and being able to communicate directly with him or her.

The system of sharing personal data illustrated in FIG. 1 implements a method for controlling the sharing of personal data including the main steps respectively shown in FIGS. 4 to 7 which are the recording of the personal data of the first user UA of a communicating object TA of the network, the sharing of personal data of the first user UA with a second user UB, the updating of personal data with the first user UA and the deletion of personal data of the first user UA in the communicating object TB of the second user UB.

During the execution of one of these steps, the requests RQ1 and responses RP1 are transmitted between the communicating object like as a personal computer and the correspondence server SC via the packet network RPQ.

Similarly, requests RQ2, RQ3, responses RP2, RP3 and control instructions ODC1, ODC2 between the communicating object TB like a mobile radio terminal and the server SC or the personal computer TA are exchanged through the radio communication networks RR and the packet network RPQ through for example a communication gateway, not shown in FIG. 1. The communication gateway may include an access gateway for communicating with the server SC through the packet network RPQ at high speed. Another access gateway of the communication gateway communicates with at least one switch of the radio communication network RR very often through an access network such as a packet network of the X.25 type or an RNIS (Réseau Numérique à Intégration de Service=Integrated Services Digital Network) or ATM (Asynchronous Transfer Mode) network.

The communication gateway exchanges, with the mobile radio terminal TB through the network RR, messages which encapsulate IP (Internet Protocol) packets transmitted to and by the correspondence server SC or the computer TA through the network RPQ.

Figure 2:
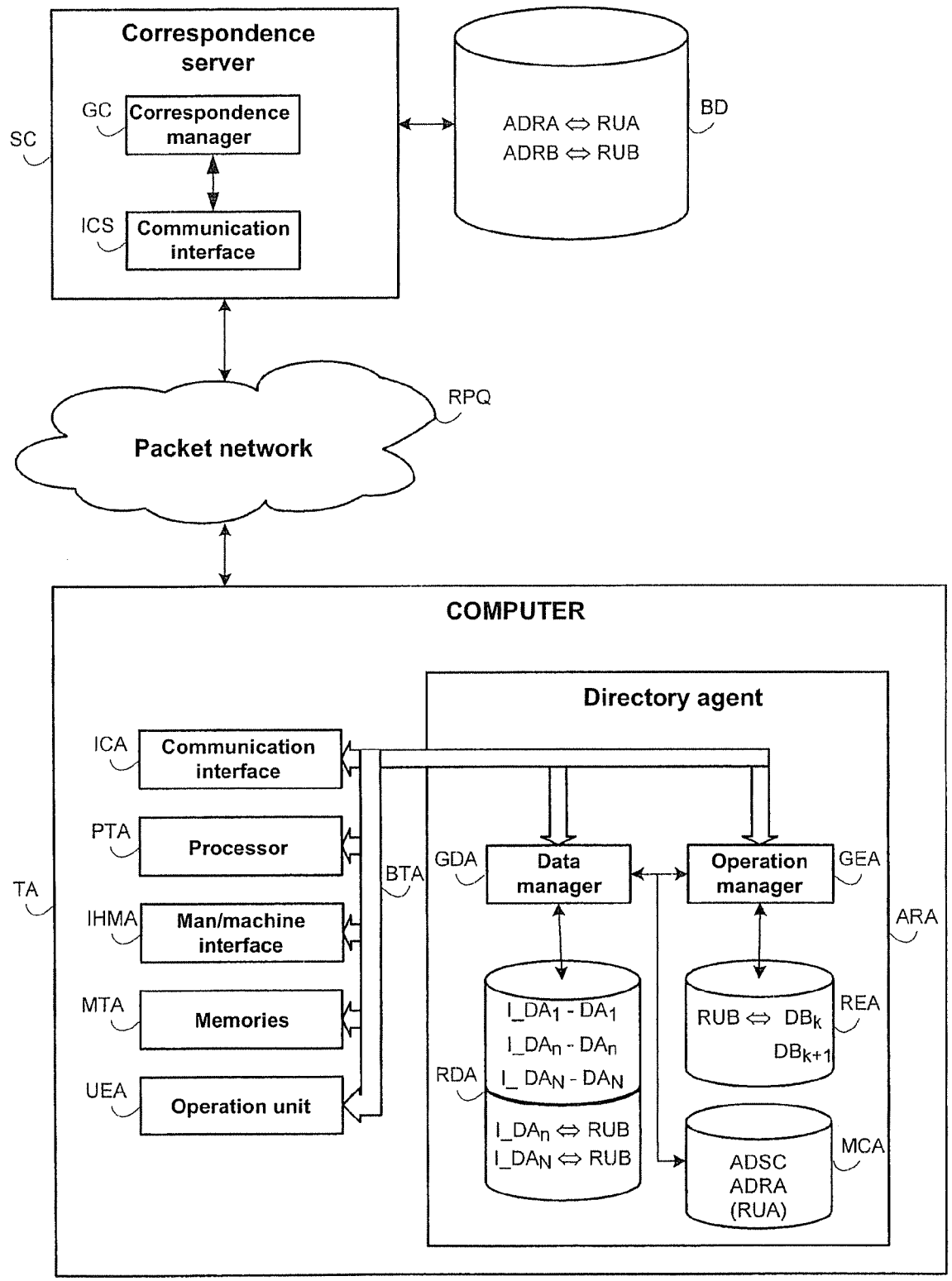
FIG. 2 is a more detailed block diagram showing a correspondence server and a personal computer as communicating object in the system of FIG. 1.

In FIG. 2 is shown the correspondence server SC and the communicating object TA in the form of functional blocks, most of which provide functions related to the invention and may correspond to software and/or hardware modules.

Figure 3:
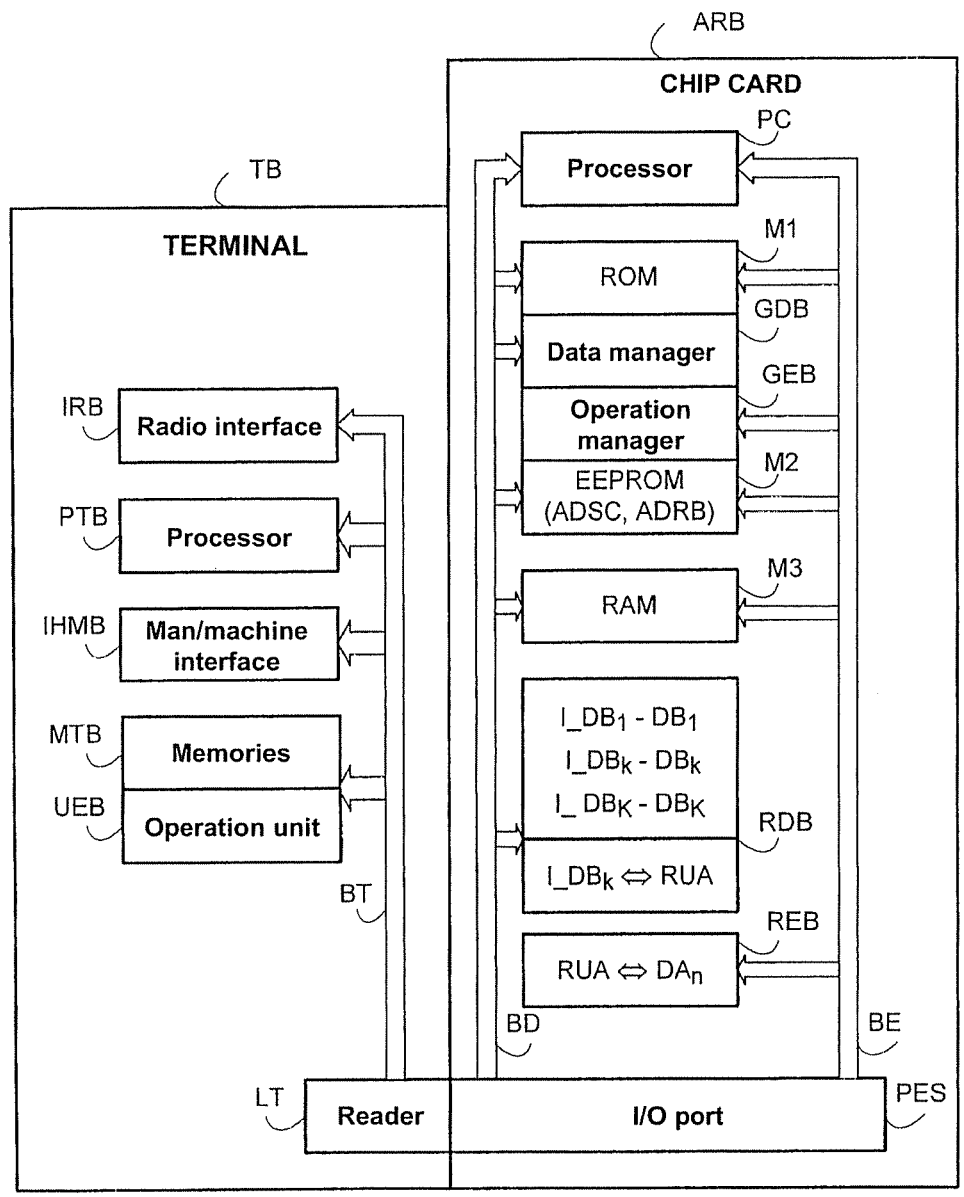
FIG. 3 is a block diagram representing a chip card as a communicating object associated with a mobile radio terminal.

In order to make FIG. 2 clearer, the communicating object TB is shown in FIG. 3 and partly includes modules identical to those of the computer TA described hereabove.

The correspondence server SC includes a correspondence manager GC which manages various operations in the database BD and the communication interface ICS for transmitting and receiving IP packets through the packet network RPQ.

The operations managed by the manager GC are more particularly the recording of correspondence respectively between anonymous users' and the access addresses of the directory agents of their communicating objects, and the search for an access address according to the associated anonymous reference of a user transmitted by the communicating object of another user.

While referring to FIG. 2, the communicating object TA is a personal computer.

The personal computer TA includes a communication interface ICA, a processor PTA, a man/machine interface IHMA, memories MTA, an operation unit UEA and a directory agent ARA. Various elements of the terminal are interconnected by a bidirectional bus BTA.

The interface IHMA controls the interaction between the computer TA and the user UA and includes a keyboard associated to a display and/or a touch screen and if need be a voice recognition device.

The directory agent ARA manages the personal data of the user UA and uses the personal data of other users of communicating objects, provided it was authorized to do so by such other users UA. The directory agent ARA communicates with the directory agents of the communicating objects of second and third users in order either to transmit control instructions or controlling in the directory agents of the second users the shared personal data of the user UA, or executing in the agent ARA control instructions transmitted by the directory agents of the third users relating to the shared personal data of the third users. At least one user can be both a second user and a third user.

The directory agent ARA includes the data manager GDA connected to a personal data directory RDA, an operation manager GEA connected to an operation directory REA and a common memory MCA. The memory MCA can be accessed by both managers GDA and GEA and memorizes the access address ADCS of the correspondence server SC and the access address ADRA of the directory agent ARA.

As an alternative solution, the directories RDA and REA are merged into a single directory.

The data manager GDA manages the personal data $DA_1$ to $DA_N$ of the user UA recorded in the data directory RDA, with each corresponding to a data identifier $I\_DA_1$, $I\_DA_N$. The personal data are for example the user's name, first name, birth date, personal address, phone number or numbers, function and professional address. A user's personal data can also be data other than data identifying the user and can for example be photographs or personal films of the user. The manager GDA also manages personal profiles drawn up the user UA. Each profile includes one personal datum or personal data selected among the personal data $DA_1$ to $DA_N$ and is also recorded in the directory RDA in association with a profile identifier. The personal profile of a user are for example a personal profile, a commercial profile for customers, a profile for friends and a profile for a club membership.

The data directory RDA also records associations connecting each personal data identifier or each personal profile of the user UA with one anonymous reference or anonymous references of users of other communicating objects of the network who are authorized by the user UA to use the datum or the profile identified by the identifier. For example, the identifier $I\_DA_n$ of the personal datum $DA_n$, n being an index between 1 and the integer N is associated with the anonymous RUB of the user UB of the mobile radio terminal TB. Similarly, the identifier $I\_DA_N$ of the personal data $DA_N$ is also associated with the anonymous reference RUB. The same data or profile identifier can be associated to several users' anonymous references.

As an alternative solution, the personal data or the personal profiles are directly associated with one anonymous reference of several anonymous references of other users.

Such association is made when the user UA authorizes user UB to use the data $DA_n$ and $DA_N$ which are also recorded in the operations directory of the directory agent of the terminal TB.

The operation manager GEA of the agent ARA manages the personal data of other users of communicating objects, such personal data being recorded in the operation directory REA in association with the anonymous references of the users owning such data. For example the personal data $DB_k$ and $DB_{k+1}$, k being an index between 1 and the integer K, of the user UB of the mobile radio terminal TB are recorded in the directory REA in association with the reference RUB of the user UB. The user UB authorizes the user UA to use his or her personal data $DB_k$ and $DB_{k+1}$.

Optionally, the identifier $I\_DB_k$ and $I\_DB_{k+1}$ of the data $DB_k$ and $DB_{k+1}$ are also recorded in the directory REA together in the data $DB_k$ and $DB_{k+1}$.

Each one of the usable personal data is preferably accompanied with one or several rule or rules of utilization defining utilization conditions for such data. Other users' personal data recorded in the directory REA are preferably and by default hidden and are associated with graphic representations such as the icons displayed with the man/machine interface IHMA or identifiers of such graphic representations. For example, another user's phone number is represented using the interface IHMA in the form of an icon representing a telephone, to be selected by the user UA for requesting the making other communication with the other user. A rule of utilization associated with such phone number relates for example to the authorization to display said phone number using the interface IHMA. According to another example, a personal data corresponding to the personal film or pictures is associated to a rule of utilization of the digital right management type (DRM)

During the updating or the deleting of a personal datum of the user UA in an operation directory of another user authorized to use such personal datum, the data manager GDA transmits a control instruction to the operation manager of the other user, so that the latter updates or deletes the datum in the associated operation directory.

Similarly, the operation manager GDA carries out control instruction transmitted by data managers in other users' communicating objects, whose personal data or personal profiles are recorded in the operation directory REA.

The operations managed by the managers GDA and GEA are described in greater details while referring to FIGS. 4 to 7.

The operating unit UEA operates other users' personal data recorded in the directory REA of the operation agent ARA without modifying said personal data and while respecting the rules for the utilization associated to such data. For example, when a user has selected an icon representing another user's phone number, the operation unit UEA receives a phone number from the operation manager GEA, in order to make a communication with the communicating object associated with such number, without the user UA knowing said number.

As an alternative solution, the operation unit UEA is integrated in the directory agent ARA.

According to another alternative solution, the operation unit UEA is directly connected to the operation directory REA.

According to an alternative implementation of the communicating object, the directory agent only includes one of both managers GDA and GEA and the directory associated thereto either for recording and controlling the personal data of the user of the communicating object or recording and using the personal data of other users.

According to a preferred implementation of the invention illustrated in FIG. 3, the directory agent ARB is a chip card associated with contact or without contact to the mobile radio terminal TB.

The mobile radio terminal TB includes a radio interface IRB, a processor PTB, a man/machine interface IHMB, memories MTB and a card reader LT. The various elements of the terminal are interconnected by a bidirectional bus BT.

The memories MTB include among others an operation unit UEB.

The chip card ARB is an MMC (Multi-Media Card) or an SD (Secure Digital) or a USB (Universal Serial Bus) or a UICC (Universal Integrated Circuit Card) chip card. The UICC chip card is for example a card provided with a SIM (Subscriber Identity Module) application when the terminal hosting the card is a mobile connected to a network of the GMS/GPRS (Global System for Mobile communications/General packet Radio Service) or a USIM (Universal Subscriber Identity Module), RUIM (Removable User Identity Module), ISIM (IP Subscriber Identity Module) or EAP-SIM (Extensible Authentication Protocol) types, when the terminal hosting the card is a mobile operated with a CDMA (Coded Division Multiple Access) of the third generation (3GPP) of the UMTS or UTRAN types or of the third generation (3GPP2) of the CDMA 2000 type.

The chip card ARB mainly includes a processor PC or several processors, memory blocs M1 to M3, a data directory RDB and an operation directory REB. The card exchanges instructions or requests and responses with the terminal TB through an inlet/outlet port PES and the reader LT with or without contact.

The directories RDB and REB are identical to the directories RDA and REA of the agent ARA of the computer TA.

The memory M1 includes a memory of the ROM or Flash type which includes the system operating the card.

The memory M2 is a non volatile memory for example an EEPROM or Flash memory more particularly for storing keys, identity numbers and other parameters of the profile of the user owning the card, such as the PIN code and other security data. The memory M2 plays a role similar to the common memory MCA of the directory agent ARA according to FIG. 2 and thus memorizes the access address ADSC of the correspondence server SC and the access address ADRB of the card ARB.

The data manager GDB and the operation manager GEB of the card ARB are distributed in the memories M1 and M2 and are similar to the managers GDA and GEA of the directory agent ARA in the computer TA.

The memory M3 is a RAM or an SRAM memory more particularly used for processing data.

The processor PC, the memory M1, the data manager GDB, the memories M2 and M3, the data directory RDB and the port PES in the card are interconnected with a bidirectional bus BD. Similarly, the processor PC, the memory M1, the operation manager GEB, the memories M2 and M3, the operation directory REB and the port PES in the card are interconnected with a bidirectional bus BE.

The invention is not limited to a mobile radio terminal associated with a chip card. The chip card may also be a card included in a portable computer for example connected to a mobile terminal or directly connected to the internet network, a payment card, an electronic purse card, a health card, an electronic passport or any other additional card associated with a mobile terminal.

According to other alternative solutions, the invention also applies to other communicating objects such as a communicating personal digital assistant PDA or a portable domestic terminal or non portable domestic terminal such as a video game console or a smart television set cooperating with a display remote control or an alphanumerical keyboard also used as a mouse through an infrared connection.

Figure 4:
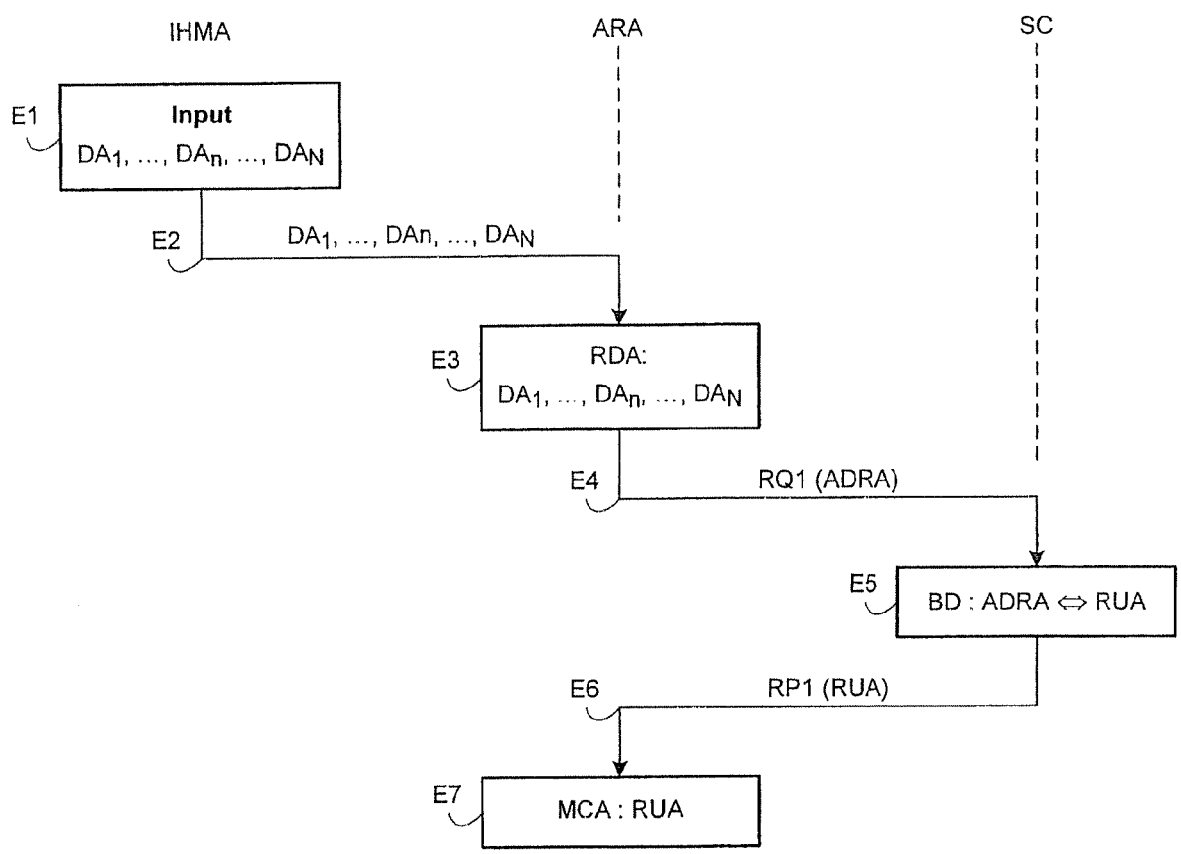
FIG. 4 is an algorithm representing the step of recording personal data of the method for controlling the sharing of personal data according to the invention.

While referring to FIG. 4 and as regards the communicating objects TA and TB of FIGS. 1 to 3, the step of recording the personal data of the method for controlling a sharing of personal data includes step E1 to E7.

During step E1, the user UA inputs with the man/machine interface IHMA of the computer TA personal data $DA_1$ to $DA_N$ characterizing him or her and draws personal profiles from such input personal data. The user can also input for each personal datum and/or each personal profile rules of utilization of the datum and/or of the profile. The rule of utilization of a datum included in two different profiles can vary from one profile to another.

Figure 5:
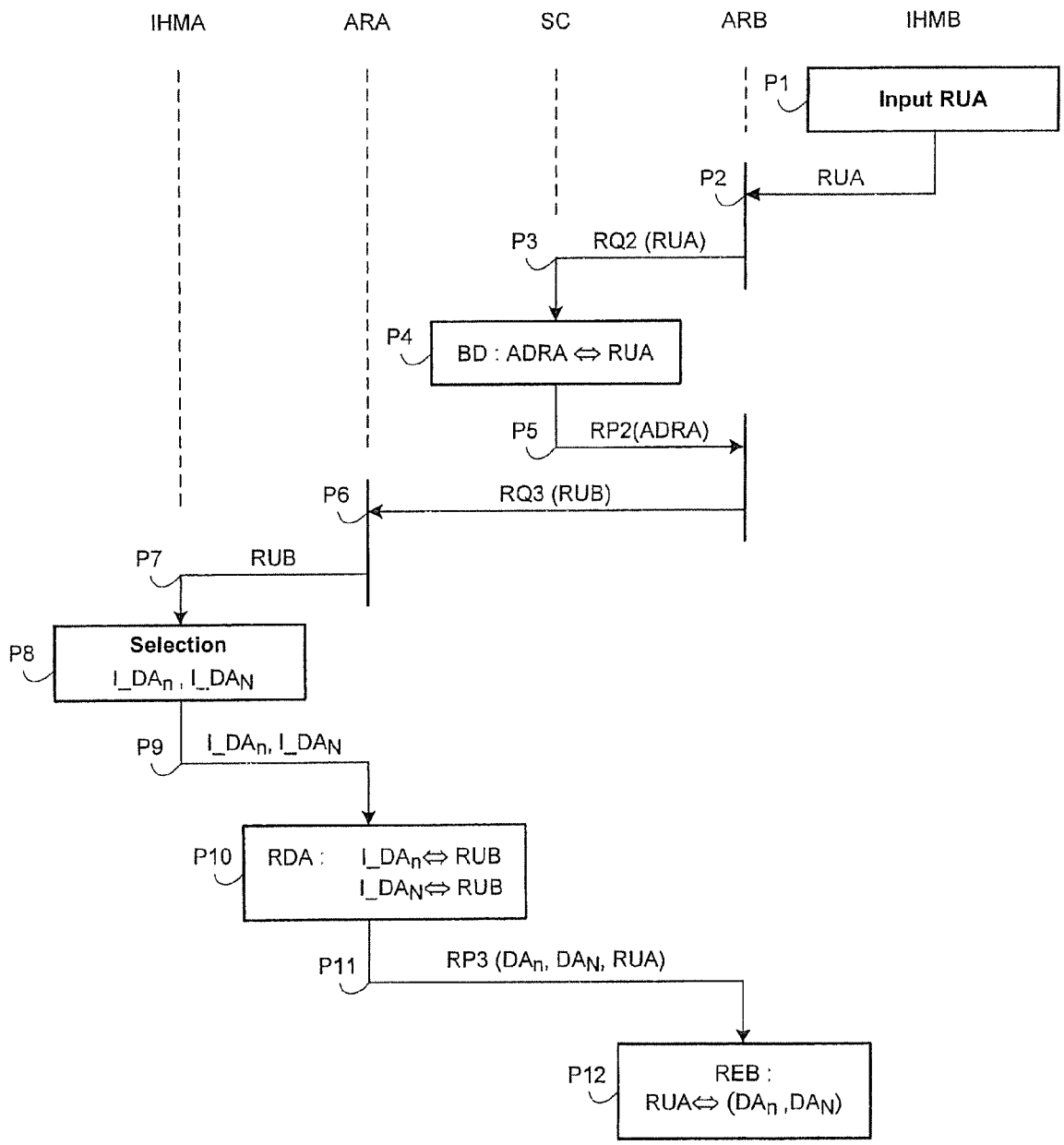
FIG. 5 is an algorithm representing a step of sharing personal data of the method according to the invention.

The rules of utilization can also be input during the main step of sharing the personal data with another user, as described while referring to FIG. 5.

During step E2, the personal data $DA_1$ to $DA_N$, the personal profiles and the rules of utilization associated to the data and profiles are supplied by the interface IHMA to the data manager GDA to be recorded into the data directory RDA. The data $DA_1$ to $DA_N$ together with the rules of utilization thereof are recorded into the directory RDA during step E3 in association with identifiers $I\_DA_1$ to $I\_DA_N$. Similarly the profiles together with the rules of utilization thereof are recorded into the directory RDA in association with profile identifiers.

During step E4, the data manager GDA draws up a request for recording RQ1 including the access address ADRA of the directory agent ARA and transmits said personal data to the correspondence server SC the access address ADSC of which is read in the common memory MCA of the directory agent ARA.

During step E5, the communication interface ICS of the correspondence server SC receives the request RQ1 which is treated by the correspondence manager GC of the server SC. The manager GC generates an anonymous reference RUA characterizing the user UA and matches the reference RUA generated at the received access address ADRA, the matching being memorized in the database BD of the server. During step E6, the user's reference RUA is transmitted via a response RP1 to the directory agent ARA of the computer TA.

During step E7, the communication interface ICA of the computer TA receives the response RP1 and transmits said personal data to the data manager GDA which treats said personal data. The data manager records the reference RUA received in the common memory MCA of the directory agent ARA.

The user UB of the mobile radio terminal TB records, during the same steps E1 to E7, his or her personal data $DB_1$ to $DB_K$, his or her profile and the associated rules of utilization and receives from the correspondence server SC an anonymous reference RUB matched in the base BD to the access address ADRB of the chip card ARB.

While referring to FIG. 5 and as regards the communicating object TA and TB of FIGS. 1 to 3, the step of sharing personal data $DA_n$ and $DA_N$ of the user UA with the user UB includes steps P1 to P12.

The user UB wishes to obtain the personal data from the user UA.

Initially the user UB knows the anonymous reference RUA of the user UA which was transmitted to him or her, for example by the user UA himself, herself or by a server managing anonymous confidential data. For each user who requests so, the managing server records encoded confidential data of the user in association with the user's anonymous reference. The confidential data also called personal data have been encoded in the user's communicating object and transmitted to the managing server. When the user UB wishes to obtain the anonymous reference of the user UA, he or she transmits to the managing server a request containing an encoded search datum characterizing the user UA. The managing server searches the reference RUA of the user UA among recorded encoded personal data associated with other users' references in the server according to the transmitted encoded search data and transmits to the terminal TB at least the reference RUA associated to the encoded personal data identical to the encoded search datum. Then the user UB obtains the anonymous reference RUA from the user UA without knowing the personal data of the user UA.

During step P1, the user UB inputs and/or validates the reference RUA of the user UA using the man/machine interface IHMB. The reference RUA is transmitted to the operation manager GEB of the directory agent ARB of the terminal TB during step P2.

During step P3, the operation managers GEB draws up a request RQ2 containing the reference RUA. The request RQ2 is transmitted using the radio interface IRB of the terminal TB to the correspondence server SC the address ADSC of which is read in the common memory M2 of the directory agent ARB.

During step P4, the communication interface ICS of the server SC receives the request and supplies it to the correspondence manager GC which treats said personal data. The manager GC finds the access address ADRA corresponding to the reference RUA extracted from the received request in the database BD. During step P5, the correspondence manager GC draws up a response RP2 containing the access address ADRA that the server SC transmits to the operation manager GEB of the directory agent ARB of the terminal TB using the communication interface ICS.

Upon reception of the response RP2 during step P6, the operation manager GEB draws up a request RQ3 containing the reference RUB of the user UB and requests a communication with the directory agent ARA of the computer TA, the access address ADRA of which it knows in order to transmit it the request RQ3.

Optionally, the agent ARB of the terminal TB and the agent ARA of the computer TA mutually authentify prior to exchanging requests and responses.

During step P7, the data manager GEA of the directory agent ARA receives the request RQ3 and commands the interface IHMA to notify the user UA that at least one of his or her personal data is requested by a user having the reference RUB extracted from the request RQ3.

During step P8, the user UA decides to share personal data $DA_n$ and $DA_N$ with the user UB by selecting the identifiers $I\_DA_n$ and $I\_DA_N$ of said personal data. The user UA can also select rules of utilization to be associated with the data $DA_n$ and $DA_N$ according to the user UB who is going to use said personal data.

The data identifiers and the rules of utilization associated therewith are transmitted through the interface IHMA to the manager GDA during step P9.

During step P10, the manager GDA associates the identifiers $I\_DA_n$ and $I\_DA_N$ to the reference RUB extracted from the request RQ3 and memorizes the identifiers $I\_DA_n$ and $I\_DA_N$ and the associated reference RUB in the data directory RDA. The manager GDA then collects from the directory RDA the shared personal data $DA_n$ and $DA_N$ and the anonymous reference RUA of the user UA in the response RP3. Then the manager GDA transmits the response RP3 to the operation manager GEB of the terminal TB using the interface IRA, during step P11.

Optionally, the data $DA_n$ and $DA_N$ are transmitted encoded in the response RP3 to be deciphered by the operation manager GEB of the terminal TB prior to be treated.

During step P12, the operation manager GEB extracts the response RP3 and records into the operation directory REB the data $DA_n$ and $DA_N$ and the rules of utilization thereof, in association with the reference RUA of the user UA and interrupts the communication with the agent ARA.

Optionally, the operation manager GEB indicates the user UB by means of a notification that the directory REB includes personal data of the user UA.

Similarly, and optionally, the identifiers $I\_DA_n$ and $I\_DA_N$ are included in the response RP3 and are recorded at the same time with data $DA_n$ and $DA_N$ in the directory REB of the terminal TB.

As an alternative solution, the step P10 associating the identifiers $I\_DA_n$ and $I\_DA_N$ with the reference RUB extracted from the request RQ3 in the data directory RDA acts after receiving the confirmation that the data $DA_n$ and $DA_N$ have been recorded into the directory REB by the terminal TB.

According to another exemplary embodiment, during step P8 the user UA can select a personal profile identifier, for example the profile "for friends" the data of which are included in the profile and transmitted to the operation manager GEB of the terminal TB and are recorded into the operation directory REB in association with the reference RUA. Optionally, the profile identifier is transmitted together with the data to the operation manager for recording the data into the operation directory, into a contact group, the group identifier of which corresponds to the profile identifier. The profile identifier is recorded in the data directory RDA in association with the reference RUB of the user UB.

As an alternative solution, during step P6, the request RQ3 mentions the data decided by the user UB for example in a text message worded by the user UB using the interface IHMB and included in the request. The message indicating the data desired is then displayed using the interface IHMA of the computer of the user UA so that the latter can read it.

As an alternative solution, the steps P1 to P7 are eliminated when the user UB orally requests the user UA for personal data and gives him or her, his or her own reference RUB. In this alternative solution, the data manager GDA sends a request to the correspondence server SC in order to obtain the address ADRB of the directory agent ADRB of the terminal TB according to the given reference RUB. Then the data manager GDA requests a communication with the agent ARB having the access address ADRB, in order to transmit the data $DA_n$ and $DA_N$ selected by the user UA to the operation manager GEB of the agent ARB.

Figure 6:
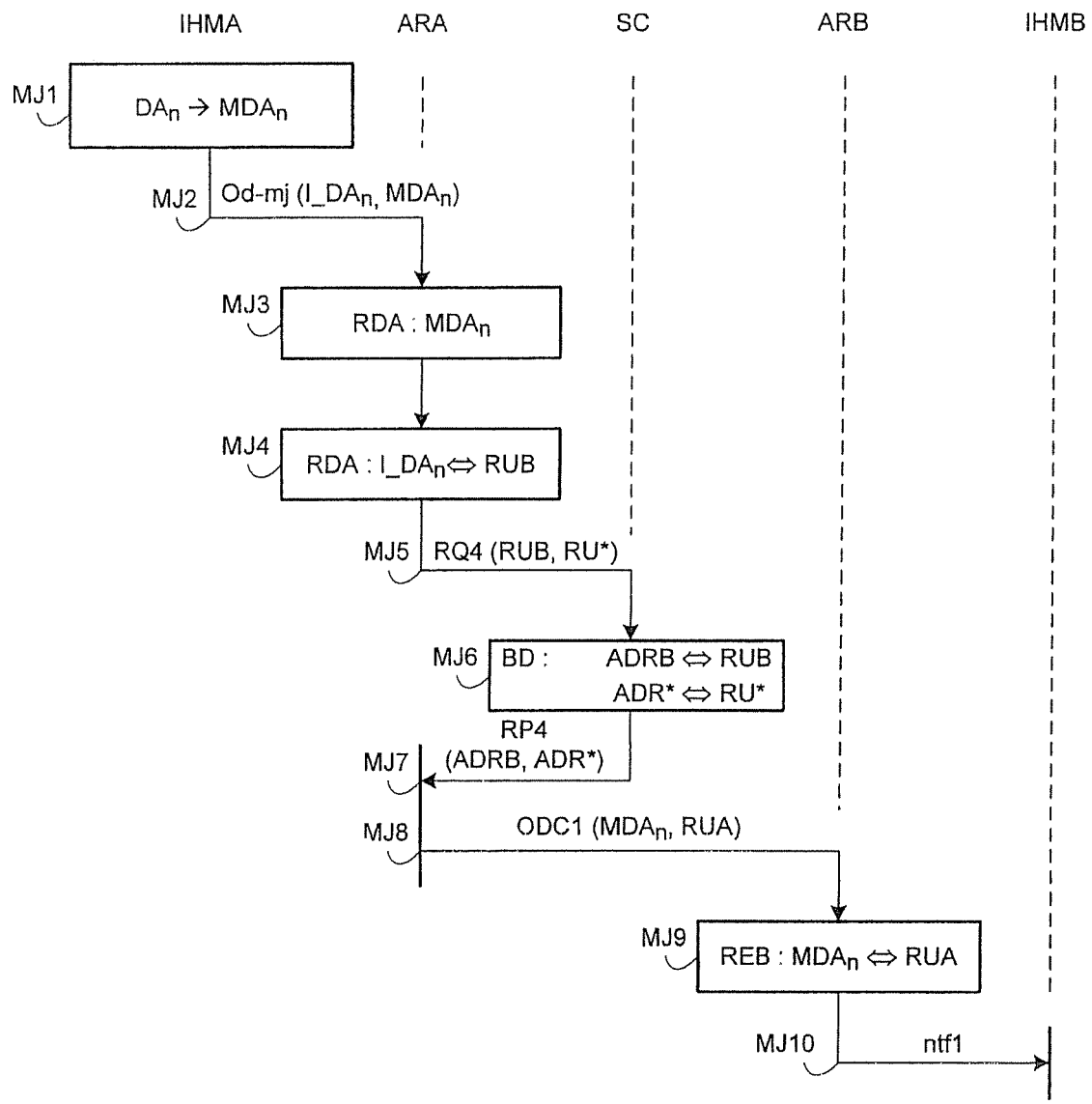
FIG. 6 is an algorithm representing the step of updating personal data according to the invention.
Figure 7:
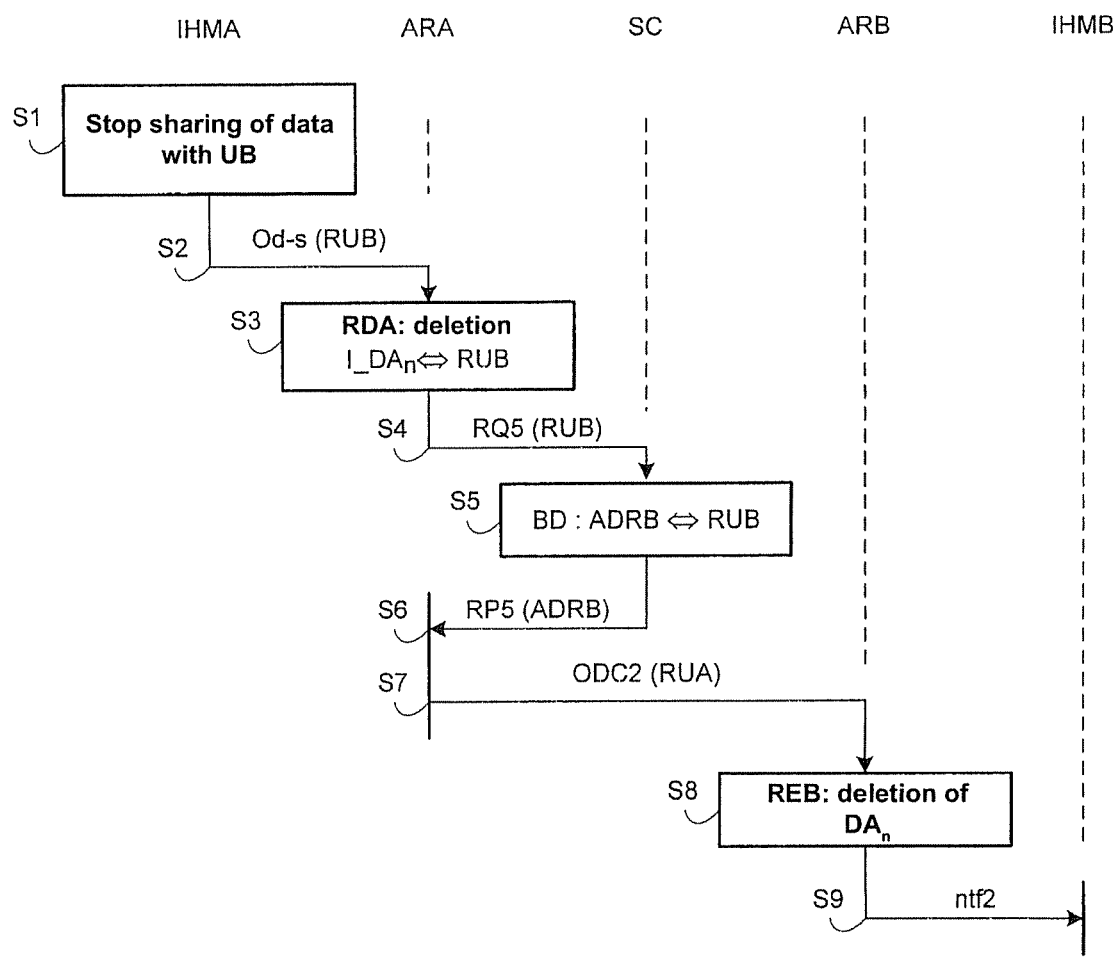
FIG. 7 is an algorithm representing a step of deleting personal data of the method according to the invention.

While referring to FIGS. 6 and 7 and with respect to the communicating objects TA and TB of FIGS. 1 to 3, the directory agent ARA of the computer TA controls the data $DA_n$ and $DA_N$ in the directory agent ARB of the terminal TB, i.e. an updating of the personal data of the user UA and a deletion of the user's personal data in the terminal TB of the user UB.

While referring to FIG. 6, a step of updating a personal data $DA_n$ of the user UA includes steps MJ1 to MJ10.

During step MJ1, the user UA modifies the datum $DA_n$ into the modified datum $MDA_n$ using the interface IHMA which supplies an updating instruction Od-mj to the data manager GDA during step MJ2. The updating instruction Od-mj contains a modified datum $MDA_n$ and the associated identifier $I\_DA_n$. During step MJ3, the manager GDA finds the datum DAn in the data directory RDA according to the associated identifier $I\_DA_n$ and records the modified datum $MDA_n$ by overwriting the former datum $DA_n$.

During step MJ4, the manager GDA searches in the data directory RDA for one or several reference(s) RU* of users of other electronic objects associated to the identifier $I\_DA_n$ of the data $DA_n$ and $MDA_n$, and more particularly finds the reference RUB of the user UB among the references RU*. During step MJ5, the data manager draws up a request RQ4 containing all the references RU* found, inclusive of the reference RUB and transmits the request RQ4 to the correspondence server SC having the access address ADSC read from the common memory MCA of the directory agent ARA, via the communication interface ICA.

During step MJ6, the communication interface ICS of the correspondence server SC receives the request RQ4 and supplies it to the correspondence manager GC which processes it. The manager GC finds in the database BD the access addresses ADR* corresponding respectively to the references RU* extracted from the received request inclusive of the access address ADRB corresponding to the reference RUB of the user UB. During step MJ7, the correspondence manager GC draws up a response RP4 containing said access addresses ADR* inclusive of the address ADRB that the server SC transmits using the communication interface ICS to the data manager GDA of the directory agent ARA of the computer TA.

The communication interface ICA of the computer TA receives the response RP4 and supplies it to the data manager GDA which successively requests a communication with each one of the directory agents of the communicating objects depending on the access addresses ADR* which are extracted from the response RP4. Thus during step MJ8, the data manager GDA draws up an updating control instruction ODC1 containing the modified data $MDA_n$ and the reference RUA of the user UA and optionally the identifier $I\_DA_n$ associated to the data MDAn and requests a communication with the directory agent ARB of the terminal TB to transmit thereto the control instruction ODC1.

Optionally, the agent ARA of the computer TA and the agent ARB of the terminal TB mutually authentify prior to exchanging or treating the control instruction. Similarly, the modified datum $MDA_n$ can be transmitted enciphered in the control instruction thus to be deciphered by the operation manager GEB of the terminal TB prior to be treated.

During step MJ9, the radio interface IRB of the terminal TB receives the control instruction ODC1 which it supplies to the operation manager GEB of the agent ARB. The manager GEB interrupts the communication with the agent ARB, finds the initial datum associated with the reference RUA of the user UA extracted from the control instruction ODC1 and replaces it by the modified datum $MDA_n$ extracted from the control instruction ODC1.

Optionally, during step MJ10, the operation manager GEB of the directory agent ARB indicates the updating of the former datum $DA_n$ to the user UB through a notification ntf1 using the man/machine interface IHMB of the terminal.

Optionally, upon completion of the updating of the modified datum $DA_n$ in the directory RBE, the terminal TB transmits a confirmation of such updating to the computer TA.

While referring to FIG. 7, a step of deletion of the personal data of the user UA in the terminal TB includes steps S1 to S9.

During step S1, the user Ua decides to no longer share his or her personal data with the user UB and validates the deletion of said personal data using the interface IHMA which applies a deletion instruction Od-s containing the reference RUB of the user UB to the data manager GDA during step S2.

During step S3, upon reception of the deletion order Od-s, the data manager GDA deletes from the data directory RDA all the associations of identifiers of personal data or personal profile with the reference RUB of the user UB.

During step S4, the data manager GDA draws up a request RQ5 containing the reference RUB and transmits it to the correspondence server SC having the access address ADSC read from the common memory MCA of the directory agent ARA, via the communication interface ICA.

During step S5, the communication interface ICS of the correspondence server SC receives the request RQ5 and supplies it to the correspondence manager GC which treats said personal data. The manager GC finds the access address ADRB corresponding to the reference RUB extracted from the received request RQ5 in the database BD. During step S6, the correspondence manager GC draws up a response RP5 containing the access address ADRB found which he or she transmits using the communication interface ICS to the data manager GDA of the directory agent ARA of the computer TA.

The communication interface ICA of the computer TA receives the response RP5 and supplies it to the data manager GDA. During step S7, the manager GDA draws up a deletion control instruction ODC2 relating to the deleting of a datum and containing the reference RUA of the user UA and requests a communication with the directory agent of the terminal TB depending on the access address ADRB to transmit it the control order ODC2.

Optionally, the agent ARA of the computer TA and the agent ARB of the computer TB mutually authentify prior to exchanging or treating the control instruction.

During step S8, the radio interface IRB of the terminal TB receives the control instruction ODC2 which it applies to the operation manager GEB of the agent ARB. The manager GEB deletes from the operation directory REB all the personal data associated with the reference RUA extracted from the control instruction ODC2.

During step S9, the operation manager GEB of the directory agent ARB indicates the deletion of the personal data $DA_n$ or $MDA_n$ of the user UA in the terminal TB to the UB through a notification ntf2.

As an alternative solution, the step S3 of deletion of all the associations of identifiers of personal data or personal profile with the reference RUB of the user UB of the directory RDA occurs after receiving a confirmation of the deletion of the personal data of the user UA from the directory REB by the terminal TB.

According to another alternative solution, the user UA wishes to delete a part of his or her personal data shared with the user UB in the terminal TB. Thus, during step S1, the user UA selects the personal data he/she wishes to delete using the interface IHMA which supplies the data manager GDA with the deletion instruction Od-s containing said selected personal data. Similarly, during step S6, the manager GDA transmits a deletion instruction ODC2 to the operation manager GEB of the terminal TB, the control instruction ODC2 containing the reference RUA of the user UA and the selected personal data or their associated identifiers in order to delete from the operation directory REB the selected personal data which are found according to the reference RUA and the personal data or their identifiers extracted from the control order ODC2. During step S10, the data manager GDA deletes from the data directory RDA the associations connecting the reference RUB of the user UB and the identifiers of the personal data which have been selected by the user UA at step S1.

The invention described hereabove relates to a method for sharing personal data. According to one implementation, the steps of the method of the invention are determined by the instructions of a computer program integrated in the communicating objects TA, TB communicating together through a telecommunications network RR-RPQ. The program includes program instructions which, when said program is run in a processor of a communicating object, carry out the steps of the method according to the invention.

As a consequence, the invention can also apply to a computer program, more particularly a computer program recorded on or in an information support legible by a computer and any data processing device adapted to implement the invention. Such program can use any programming language and be in the form of a source code, an object code or an intermediate code between the source code and the object code such as in a partially compiled shape or any other shape desirable for implementing the method according to the invention.

The invention claimed is:

1. A method for controlling sharing of personal data of a first user of a first communicating device with a second user of a second communicating device, comprising the following steps:
   sharing, in the first communicating device, in response to a request from a second user, personal data of the first user recorded in the first communicating device among other personal data of the first user,
   receiving, by the first communicating device, an anonymous reference of the second user for anonymously referencing the second user to the first user;
   receiving, by the second communicating device, an anonymous reference of the first user for anonymously referencing the first user to the second user;
   associating, in the first communicating device, the personal data shared with the anonymous reference of the second user, wherein the associating step comprises recording, in the first communicating device, the personal data shared and the anonymous reference of the second user for identifying the personal data that was shared with the second user; and
   transmitting the shared personal data to the second communicating device along with rules of utilization for the shared personal data and recording said shared personal data and rules of utilization in the second communicating device in association with the anonymous reference of the first user, wherein the recording step comprises recording, in the second communicating device, the shared personal data and the rules of utilization and the anonymous reference of the first user for identifying the personal data that was received from the first user,
   wherein the anonymous reference characterizes the respective user and/or their communicating object, without another user being able to identify the respective user directly and without another user being able to communicate directly with the respective user.

2. A method according to claim 1, including after the step of sharing, a step of controlling, from the first communicating device, the shared personal data of the first user by transmitting a control instruction containing at least the anonymous reference of the first user to the second communicating device in order to find, in the second communicating device, the personal data of the first user in association with the anonymous reference of the first user extracted from the control instruction and to treat said personal data according to the transmitted control instruction.

3. A method according to claim 2, wherein the step of controlling includes:
   in the first communicating device, updating at least one personal datum of the first user into a modified personal datum, searching for the anonymous reference of the second user associated with the personal datum, and transmitting the control instruction containing the modified personal datum and the anonymous reference of the first user to the second communicating device, and updating the personal datum associated with the reference of the first user extracted from the control instruction in the second communicating device according to the modified personal datum extracted from the control instruction.

4. A method according to claim 2, wherein the step of controlling includes a transmission of the control instruction containing the anonymous reference of the first user from the first communicating device to the second communicating device, the deletion of at least one personal datum associated with the anonymous reference of the first user extracted from the control instruction in the second communicating device and the deletion of the association between said personal datum and the anonymous reference of the second user in the first communicating device.

5. A method according to claim 1, wherein the step of controlling further includes the transmission of the anonymous reference of the second user from the first communicating device to server means and the transmission of an access address corresponding to the transmitted anonymous reference of the second user from the server means to the first communicating device, so that the first communicating device transmits, according to the access address, the control instruction to the second communicating device.

6. A method according to claim 1, initially including recording personal data of the first user in the first communicating device, transmitting an access address of the first communicating device from said first said communicating device to server means, generating the anonymous reference of the first user by the server means, and matching the anonymous reference of the first user with the access address transmitted in the server means.

7. A method according to claim 3, wherein the step of controlling includes a transmission of the control instruction containing the anonymous reference of the first user from the first communicating device to the second communicating device, the deletion of at least one personal datum associated with the anonymous reference of the first user extracted from the control instruction in the second communicating device and the deletion of the association between said personal datum and the anonymous reference of the second user in the first communicating device.

8. A method according to claim 2, wherein the step of controlling further includes the transmission of the anonymous reference of the second user from the first communicating device to server means and the transmission of an access address corresponding to the transmitted anonymous reference of the second user from the server means to the first communicating device, so that the first communicating device transmits, according to the access address, the control instruction to the second communicating device.

9. A method according to claim 3, wherein the step of controlling further includes the transmission of the anonymous reference of the second user from the first communicating device to server means and the transmission of an access address corresponding to the transmitted anonymous reference of the second user from the server means to the first communicating device, so that the first communicating device transmits, according to the access address, the control instruction to the second communicating device.

10. A method according to claim 4, wherein the step of controlling further includes the transmission of the anonymous reference of the second user from the first communicating device to server means and the transmission of an access address corresponding to the transmitted anonymous reference of the second user from the server means to the first communicating device, so that the first communicating device transmits, according to the access address, the control instruction to the second communicating device.

11. A method according to claim 2, initially including recording personal data of the first user in the first communicating device, transmitting an access address of the first communicating device from said first said communicating device to server means, generating the anonymous reference of the first user by the server means, and matching the anonymous reference with the access address transmitted in the server means.

12. A method according to claim 3, initially including recording personal data of the first user in the first communicating device, transmitting an access address of the first communicating device from said first said communicating device to server means, generating the anonymous reference of the first user by the server means, and matching the anonymous reference with the access address transmitted in the server means.

13. A method according to claim 4, initially including recording personal data of the first user in the first communicating device, transmitting an access address of the first communicating device from said first said communicating device to server means, generating the anonymous reference of the first user by the server means, and matching the anonymous reference with the access address transmitted in the server means.

14. A method according to claim 5, initially including recording personal data of the first user in the first communicating device, transmitting an access address of the first communicating device from said first said communicating device to the server means, generating the anonymous reference of the first user by the server means, and matching the anonymous reference with the access address transmitted in the server means.

15. A method according to claim 1, wherein the transmitting of the shared personal data to the second communicating device includes sending of the shared personal data to the second communicating device without revealing to the second communication device an identity of the first user of the shared personal data.

16. A method according to claim 1, further including:
identifying, by server means, an access address of the second communicating device according to the anonymous reference of the second user transmitted by the first communicating device; and
transmitting, by the first communicating device, information to the second communicating device in accordance with the identified access address of the second communicating device.

17. A communicating object of a first user communicating with a second communicating object of a second user for controlling sharing of personal data of the first user with the second user, comprising:
means for sharing in response to a request from the second user of a personal datum of the first user recorded in the first communicating object among other personal data of the first user,
means for receiving an anonymous reference of the second user for anonymously referencing the second user to the first user;
means for receiving an anonymous reference of the first user for anonymously referencing the first user to the second user;
means for associating the shared personal data with the anonymous reference of the second user by recording, in the first communicating object, the shared personal data and the anonymous reference of the second user for identifying the personal data that was shared with the second user,
means for transmitting the shared personal data along with rules of utilization for the shared personal data to the second communicating object in order to record the transmitted personal data and the rules of utilization in the second communicating object in association with the anonymous reference of the first user by recording, in the second communicating object, the transmitted personal data and the rules of utilization and the anonymous reference of the first user for identifying the personal data that was transmitted from the first user, and
means for controlling the shared personal data of the first user by transmitting a control instruction containing at least the anonymous reference of the first user to the second communicating object in order to find, in the second communicating object, the personal data of the first user in association with the anonymous reference of the first user extracted from the control instruction and to treat said personal data according to the transmitted control instruction,
wherein the anonymous reference characterizes the respective user and/or their communicating object, without another user being able to identify the respective user directly and without another user being able to communicate directly with the respective user.

18. A communicating object communicating with a first communicating object of a first user controlling sharing of personal data with a second user using said communicating object, comprising:

means for requesting personal data from the first user recorded in the first communicating object among other personal data of the first user, the shared personal data recorded in the first communicating object being associated with an anonymous reference of the second user for anonymously referencing the second user to the first user, wherein the shared personal data and the anonymous reference of the second user are recorded, in the first communicating object, for identifying the personal data that was shared with the second user, means for recording the transmitted shared personal data along with rules of utilization for the shared personal data in association with the anonymous reference of the first user by recording, in the second communicating object, the transmitted personal data and the rules of utilization and the anonymous reference of the first user for identifying the personal data that was shared from the first user, and means for treating the shared personal data associated with the anonymous reference of the first user extracted from a control instruction transmitted from the first communicating object according to the control instruction, wherein the anonymous reference characterizes the respective user and/or their communicating object, without another user being able to identify the respective user directly and without another user being able to communicate directly with the respective user.

19. A non-transitory computer readable medium having stored therein a program able to be implemented in a first communicating device communicating with a second communicating device of a second user for controlling sharing of personal data of a first user with the second user, said program including instructions which, when the program is run in the first communicating device, carry out the following steps:

sharing, in response to a request from the second user, the personal data of the first user recorded in the first communicating device among other personal data of the first user, receiving an anonymous reference of the second user for anonymously referencing the second user to the first user;

receiving an anonymous reference of the first user for anonymously referencing the first user to the second user;

associating the personal data shared with the anonymous reference of the second user, wherein the associating step comprises recording, in the first communicating object, the shared personal data and the anonymous reference of the second user for identifying the personal data that was shared with the second user;

transmitting the shared personal data along with rules of utilization for the shared personal data to the second communicating device, in order to record the transmitted personal data and rules of utilization in the second communicating device in association with the anonymous reference of the first user by recording, in the second communicating device, the shared personal data and the rules of utilization and the anonymous reference of the first user for identifying the personal data that was received from the first user, and controlling the shared personal data of the first user by transmitting a control instruction containing at least the anonymous reference of the first user to the second communicating device, in order to find in the second communicating device the personal data of the first user in association with the anonymous reference of first user extracted from the control instruction and to treat said personal data according to the transmitted control instruction, wherein the anonymous reference characterizes the respective user and/or their communicating object, without another user being able to identify the respective user directly and without another user being able to communicate directly with the respective user.

20. A non-transitory computer readable medium having stored therein a program able to be implemented in a communicating device communicating with a first communicating device of a first user controlling sharing of personal data with a second user using said communicating device, said program including instructions which, when the program is run in said communicating device, carry out the following steps:

requesting personal data of the first user recorded in the first communicating device among other personal data of the first user, the shared personal data recorded in the first communicating device being associated with an anonymous reference of the second user for anonymously referencing the second user to the first user, wherein the shared personal data and the anonymous reference of the second user are recorded, in the first communicating object, for identifying the personal data that was shared with the second user, recording the transmitted shared personal data along with rules of utilization for the shared personal data in association with an anonymous reference of the first user by recording, in the second communicating object, the transmitted personal data and the rules of utilization and the anonymous reference of the first user for identifying the personal data that was shared from the first user, and treating the shared personal data associated with the anonymous reference of the first user extracted from a control instruction transmitted from the first communicating device, according to the transmitted control instruction, wherein the anonymous reference characterizes the respective user and/or their communicating object, without another user being able to identify the respective user directly and without another user being able to communicate directly with the respective user.

\* \* \* \* \*